United States Patent [19]
Hindersinn et al.

[11] 3,880,806
[45] *Apr. 29, 1975

[54] CURED COMPOSITIONS OF EPOXY RESINS WITH 2,6-DIKETO-N-CARBOXYMETHYLMORPHOLINE

[75] Inventors: Raymond R. Hindersinn, Lewiston; George C. Hopkins, Clarence; Charles S. Ilardo, Tonawanda, all of N.Y.

[73] Assignee: Hooker Chemicals & Plastics Corporation, Niagara Falls, N.Y.

[ * ] Notice: The portion of the term of this patent subsequent to Sept. 5, 1989, has been disclaimed.

[22] Filed: July 24, 1972

[21] Appl. No.: 274,715

Related U.S. Application Data

[60] Continuation-in-part of Ser. No. 131,456, April 5, 1971, Pat. No. 3,689,456, which is a division of Ser. No. 740,853, June 28, 1968, Pat. No. 3,621,018.

[52] U.S. Cl. ... 260/47 EN; 117/128.4; 117/161 ZB; 161/184; 260/2 N; 260/2 EA; 260/18 PF; 260/47 EA; 260/59; 260/92.3; 260/93.1; 260/94.7 N

[51] Int. Cl. ............................................. C08g 30/16
[58] Field of Search ......... 260/47 EN, 47 EA, 47 C, 260/2 N, 18 EP, 18 PF, 59, 247.2 R, 92.3, 93.1, 94.7

[56] References Cited
UNITED STATES PATENTS

| | | | |
|---|---|---|---|
| 3,419,525 | 12/1968 | Aelony | 260/47 |
| 3,689,456 | 9/1972 | Hindersinn et al. | 260/47 |

*Primary Examiner*—Morris Liebman
*Assistant Examiner*—T. Pertilla
*Attorney, Agent, or Firm*—Peter F. Casella; James F. Mudd

[57] ABSTRACT

Epoxy resins can be cured with 2,6-diketo-N-carboxymethylmorpholine as the sole curing agent to produce fully cured, strong and hard compositions, which are useful as protective coatings, adhesives, and laminating, potting, and encapsulating compounds.

5 Claims, No Drawings

CURED COMPOSITIONS OF EPOXY RESINS WITH 2,6-DIKETO-N-CARBOXYMETHYL-MORPHOLINE

REFERENCE TO PRIOR APPLICATION

This is a continuation-in-part of copending application Ser. No. 131,456, filed Apr. 5, 1971, now U.S. Pat. No. 3,689,456, which is a division of copending application, Ser. No. 740,853, filed June 28, 1968, and now U.S. Pat. No. 3,621,018.

BACKGROUND OF THE INVENTION

It has not previously been possible to prepare 2,6-diketo-N-carboxymethylmorpholine, hereinafter referred to as NTA anhydride, because conventional dehydrating techniques result in a variety of side reactions. A new process has been found by which NTA anhydride can be produced. The anhydride is useful as an epoxy curing agent.

It is the object of this invention to provide a new composition of matter, namely 2,6-diketo-N-carboxymethylmorpholine. It is also the object of this invention to provide a process for producing the NTA anhydride. It is a further object of this invention to provide a new curing agent for epoxy resins. Other objects will become apparent to those skilled in the art from the following detailed description.

SUMMARY OF THE INVENTION

This invention relates to NTA anhydride, the process for producing NTA anhydride and to uses of the anhydride. More particularly, this invention relates to a new composition of matter, NTA anhydride, which is produced by a process which comprises contacting nitrilotriacetic acid in a suitable reaction media, preferably an N,N-dialkylacetamide, with a dehydrating agent, and to the uses of the NTA anhydride so produced.

DESCRIPTION OF THE PREFERRED EMBODIMENT

A new composition of matter, NTA anhydride, is produced by a process which comprises contacting nitrilotriacetic acid in a N,N-dialkyl acetamide with a dehydrating agent. The alkyl substituents can contain 1 to 6 carbon atoms such as methyl, ethyl, amyl, hexyl, and the like, and the preferred acetamide is N,N-dimethyl acetamide. The nitrilotriacetic acid can be dissolved in the acetamide or in a mixture of the acetamide and the dehydrating agent. The nitrilotriacetic acid generally comprises about 1 to about 80 weight percent of the nitrilotriacetic acid — N,N-dialkyl acetamide solution, and is preferably from about 10 to about 50 weight percent.

Conventional dehydrating agents can be employed to convert the nitrilotriacetic acid to its anhydride. Typical dehydrating agents include organic anhydrides such as acetic anhydride, propionic anhydride, maleic anhydride, succinic anhydride, and the like; enol esters such as isopropenyl acetate and the like; organic acid chlorides such as acetyl chloride and the like; $P_2O_5$; and the like dehydrating agents. The preferred dehydrating agent is acetic anhydride. The ratio of moles dehydrating agent to moles nitrilotriacetic acid can vary from 1:20 to 20:1. It is preferred to use near the stoichiometric quantity of dehydrating agent, i.e., a ratio of about 0.75 to about 1.25 moles dehydrating agent to one mole of nitrilotriacetic acid.

A typical synthesis procedure can comprise fitting a reaction vessel with a stirrer, nitrogen inlet tube, thermometer, and a steam jacketed partial condenser fitted to a water condenser and water trap. The nitrilotriacetic acid, N,N-dialkyl acetamide and dehydrating agent are charged into the vessel and heated under agitation and inert nitrogen sparge until the reaction reaches the desired level of completion, as conveniently measured by the acid number technique. The excess reagents can be removed by conventional techniques, such as steam distillation, and the NTA anhydride recovered by conventional techniques, such as precipitation. The reaction mixture can be heated from about 50° to about 140°C, preferably about 70° to about 100°C. The time necessary to complete the above-described reaction can vary from 0.5 to 24 hours, although times of 2 to 10 hours are preferred.

The NTA anhydride can be employed as a curing agent for any of those materials known in the art as epoxy resins. Included in this classification are resins such as the well-known reaction products of a dihydric phenol and a halohydrin, epoxidized hydrocarbons, epoxidized vegetable oils, as well as naturally occurring materials of the same type containing the oxirane ring structure. By the terms "epoxy resin" or "polyepoxide" as used herein, is meant the compounds which contain adjacent carbon atoms to which oxirane oxygen is attached. The epoxy resins that are the reaction products of a dihydric phenol and halohydrin are generally obtained by reacting at a temperature of about 50° to 150°C at least one mole of the halohydrin, such as epichlorohydrin, glycerol dichlorohydrin, 3-chloro-1,2-propanediol, and the like, with one mole of the dihydric phenol, such as resorcinol, dihydroxy diphenyl propane, polyhydric phenol formaldehyde condensation products, and the like, in the presence of an alkali metal hydroxide such as sodium and potassium hydroxide or an alkaline earth hydroxide such as calcium and barium hydroxide. The epoxy resins which are formed by epoxidizing unsaturated hydrocarbons can be prepared, for example, by reacting the unsaturated polyolefin, such as polyvinylcyclohexene, polychloroprene, polyisoprene, polybutadiene, and the like, with a suitable reactant such as acetyl peroxide for several hours at an elevated temperature. Another type of epoxy resin useful in this invention are the polyepoxides derived from naturally occurring vegetable oils, or their derivatives, such as epoxidized soy bean oil, epoxidized linseed oil, epoxidized glycerol dilinoleate, and the like. Such materials are prepared, for example, by agitating the compound to be epoxidized with a peracetic acid solution, prepared from glacial acetic acid, 30 percent hydrogen peroxide and 1 percent sulfuric acid catalyst.

In the practice of the invention, the NTA anhydride curing agent is mixed with the desired uncured epoxy resin at room temperature or at an elevated temperature. The curing agent is preferably incorporated in an amount from about 2 to about 40 parts by weight per 100 parts of uncured epoxy resin, and preferably from about 5 to about 15 parts by weight. The curing temperatures vary over a wide range from 50° to about 250°C, but are preferably in the range of about 100° to about 200°C. The time necessary to effect curing varies with the particular ingredients of the curing system, from several minutes to several days, however, it is preferably from about 0.5 to about 48 hours.

The NTA anhydride can also be used as a chemical intermediate in preparing useful chemical derivatives not easily prepared by other methods. The following reactions are typical:

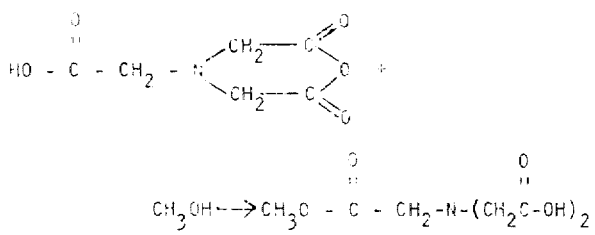

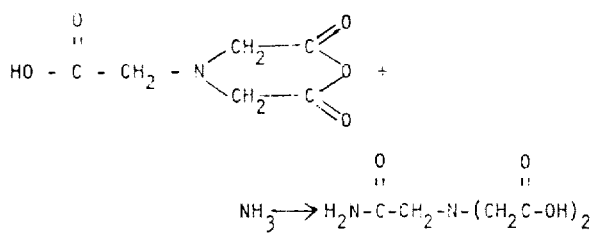

The latter acids are useful as chelating agents (see Dayatlova et al., Russian Chemical Reviews, 481–496 [July, 1965]).

The following examples are presented to further illustrate the invention, but are not intended to limit it. All parts and percentages are by weight and temperatures in degrees centigrade unless specified otherwise.

PREPARATION OF NTA ANHYDRIDE

Example 1

A charge of 191 parts nitrilotriacetic acid, 348 parts N,N-dimethyl acetamide and 306 parts acetic anhydride were placed in a vessel equipped with a thermometer, nitrogen inlet tube, stirrer, reflux condenser, and heating means. A nitrogen sparge was employed and the vessel heated to about 90°C for about 4 hours. Thereafter, the acetic acid, unreacted acetic anhydride and N,N-dimethyl acetamide were removed at 75°–84°C under reduced pressure. The residue in the vessel was found to contain about 75 percent NTA anhydride.

Example 2

A slurry of 191 parts nitrilotriacetic acid, 110 parts acetic anhydride and 355 parts N,N-dimethyl acetamide was stirred for about 7 hours at 80°C. A small amount of the unreacted nitrilotriacetic acid was filtered from the resultant reaction mixture and most of the volatiles removed at 70°–80°C under reduced pressure. The residue was stirred with 300 parts of chloroform, filtered, and the resulting solid was thoroughly washed with 300 parts of chloroform. The resulting product was dried in vacuum at ambient temperatures to produce an off-white solid having a decomposition point of 121°–124°C. The product was further purified by solution in acetone, in which the nitrilotriacetic acid is insoluble and the anhydride is soluble. The product, NTA anhydride (2,6-diketo-N-carboxymethylmorpholine), was obtained in about 70 percent yield and 96–97 percent purity. The NTA anhydride was further characterized by the following analysis:

Elemental Analysis
: calculated: C, 41.7; H, 4.1; N, 8.1
  found     : C, 41.7; H, 4.2; N, 8.1

Nuclear Magnetic Resonance
: two singlet peaks in an area ratio of 2:1 are found at 3.90 and 3.60 ppm relative to tetramethylsilane Titration
: base titrations, aqueous and non-aqueous, showed the presence of one anhydride group and one carboxyl group, and were consistent with the assigned structure, viz

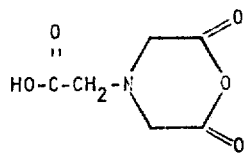

Infrared
: strong absorption bands at 1710, 1770 and 1805 $cm^{-1}$ (nujol mull), showing the presence of anhydride and carboxyl groups.

Example 3

The process of Example 2 can be repeated using a nitrilotriacetic acid which has been prepared externally or in situ from the corresponding nitrilotriacetic acid alkali metal salt, to obtain the corresponding nitrilotriacetic acid anhydride.

NTA ANHYDRIDE AS AN EPOXY CURING AGENT

Example 4

Ten parts of the NTA anhydride of Example 2 was mixed with 10 parts of the diglycidyl ether of Bisphenol A at ambient temperatures. The mixture was subjected to a two-stage cure of 24 hours at 80°C followed by 24 hours at 120°C. A strong, hard, fully cured epoxy resin was obtained. When coated around electrical parts this cured epoxy resin provides resistance to chemicals, impact, moisture, and electricity.

Various modifications can be made in the invention, without departing from the spirit and the scope thereof. Various embodiments of the invention disclosed herein serve to further illustrate the invention but are not intended to limit it.

We claim:

1. A cured composition comprising an epoxy resin which contains adjacent carbon atoms to which oxirane oxygen is attached and a curing amount of 2,6-diketo-N-carboxymethylmorpholine.

2. The cured composition of claim 1 wherein the 2,6-diketo-N-carboxymethylmorpholine is present in an amount from about 2 to about 40 parts by weight per 100 parts of uncured epoxy resin.

3. A composition of matter comprising the heat cured product of (1) an epoxide resin containing an oxirane ring structure and (2) nitrilotriacetic anhydride, the aforesaid anhydride being present in an amount from about 2 to about 40 parts by weight per 100 parts of the epoxide resin.

4. A composition according to claim 3 wherein the epoxide resin comprises the reaction product of dihydroxy diphenyl propane and epihalohydrin.

5. A composition of matter according to claim 3 wherein said nitrilotriacetic anhydride is present in an amount from about 5 to about 15 parts by weight per 100 parts of epoxide resin.

* * * * *